June 5, 1956   S. GUARNASCHELLI   2,748,804
REINFORCED HOSE
Filed Dec. 31, 1954
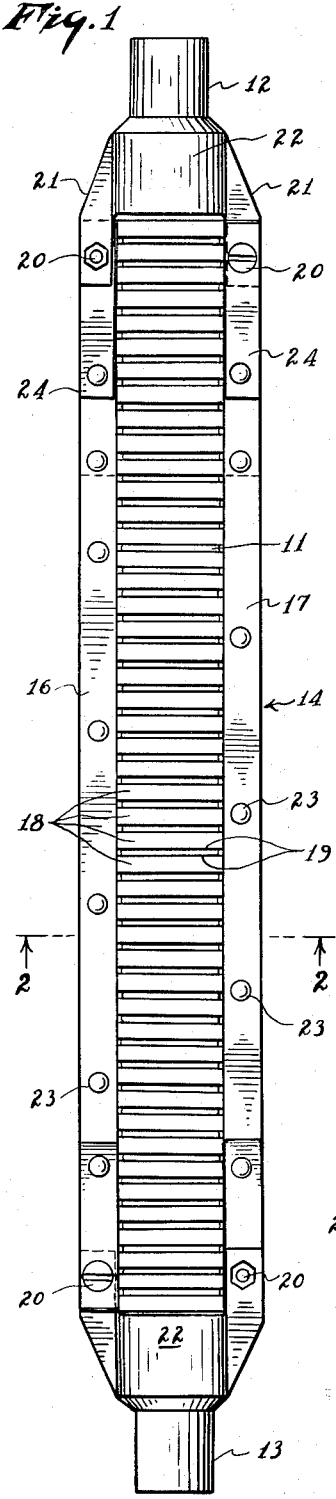
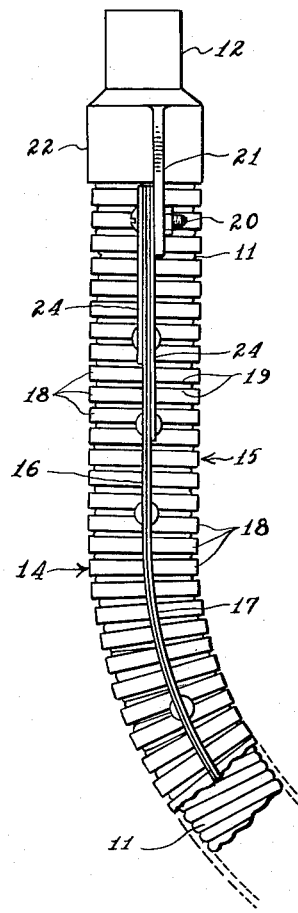
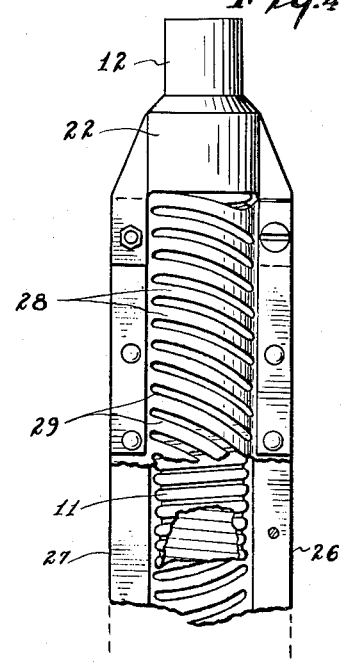
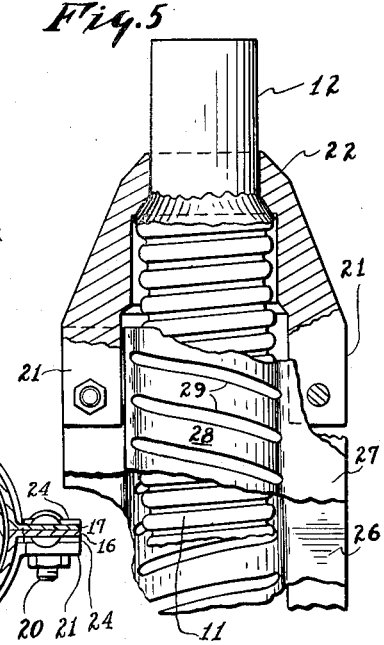
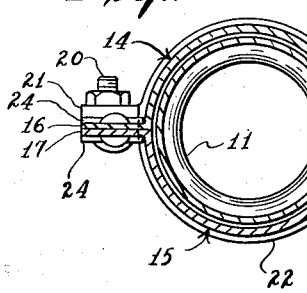
INVENTOR.
STEPHEN GUARNASCHELLI
BY
Emery, Varney, Whittemore & Dix
ATTORNEYS United States Patent Office
2,748,804
Patented June 5, 1956

2,748,804

REINFORCED HOSE

Stephen Guarnaschelli, Garden City, N. Y., assignor to Titeflex, Inc., Newark, N. J., a corporation of Massachusetts Application December 31, 1954, Serial No. 478,977

7 Claims. (Cl. 138—60)

This invention relates to reinforced hose. The hose may be flexible metal hose comprising a convoluted or a corrugated metal tube, either seamless or made from a profiled strip of metal helically wound into tubular form with the overlapping edges of the strip locked together in a continuous seam, or it may be non-metallic hose having a rubber or other suitable jacket, either with or without braids or wrappings of wire or non-metallic material incorporated in the wall thereof.

This application is a continuation-in-part of my copending application for Reinforced Hose, Serial No. 373,206, filed August 10, 1953.

It is an object of the invention to provide improved reinforced hose and hose reinforcement. It is a further object of the invention to provide hose reinforcement which will restrain the hose against longitudinal extension and against radial expansion. It also is an object of the invention to provide hose reinforcement which will restrain the hose against twisting and which will substantially limit flexure of the hose to a single plane. It is still another object of the invention to provide a hose reinforcement which is simple and economical to manufacture and apply to the hose. Other objects and advantages of the invention will appear hereinafter.

Flexible metal hose customarily is reinforced by a braided wire casing applied over the hose and secured at its ends to the end fittings of the hose. This wire casing may comprise a single braid layer, or overlying braid layers. A braid layer may consist of a braid of flat ribbon wires, or a braid of round wires, the latter usually being applied in a basket weave. A multiple layer casing may comprise different kinds of braids, for example an inner braid of flat ribbon wires and an outer basket weave braid of round wires. Longitudinal extension and radial expansion of the hose are restrained by such a reinforcement. Application of these braided reinforcing casings to flexible metal hose is a costly and time-consuming operation. The braided casing has relatively little effect to restrain the hose against twisting when subjected to torsional forces, and when the hose is bent the stresses tend to be concentrated in the braid adjacent the end fitting.

Non-metallic hose also may be reinforced by an externally applied braided casing, which may be made from metal wires or from non-metallic material. Sometimes an external braided casing is used in addition to braids or wrappings of wire or non-metallic material incorporated in the wall of the hose, and at other times it is used in lieu of such internal reinforcement. The objections to the use of braided reinforcement for non-metallic hose are similar to the objections to the use of such reinforcement for flexible metal hose.

The hose reinforcement of the present invention may replace the externally applied braided casing entirely, or if desired it may replace only the outer braid in a hose which otherwise would have a multiple layer braided casing. When used with non-metallic hose which otherwise would have reinforcement incorporated within the non-metallic wall of the hose, the reinforcement of the present invention may make unnecessary some or all reinforcement within the wall.

A preferred embodiment of the present invention selected for purposes of illustration is shown in the accompanying drawings, wherein:

Figure 1 is an elevation of a flexible metal hose having a reinforcement secured thereon;

Figure 2 is a transverse sectional view through the reinforced hose of Figure 1, taken substantially on the line 2—2, but to somewhat larger scale;

Figure 3 is an elevation showing the upper end of the reinforced hose of Figure 1 rotated 90° about its longitudinal axis and partially bent;

Figure 4 is a view similar to Figure 1, but of the upper end only of a hose and showing a slightly modified reinforcement construction; and Figure 5 is a fragmentary view to somewhat larger scale of a hose and end fitting connection, partly in elevation and partly in section, illustrating means for securing an end of the hose reinforcement relative to the end fitting on the hose.

The illustrative embodiment disclosed in Figures 1–3 will be described first. Attached to the flexible metal hose 11 with fluid tight joints are the end fittings 12, 13. In the illustrative embodiment these end fittings are short pieces of metal tubing secured to the ends of the flexible metal hose by fused metal joints, for example by welding, brazing, or silver soldering. This is more clearly shown in Figure 5. The inside diameters of these fittings ordinarily will be slightly larger than the inside diameter of the flexible hose, and the outside diameters of the fittings ordinarily will be somewhat less than the outside diameter of the flexible hose. In installing a hose with fittings of this type the end fittings will be telescoped over, or possibly into, other tubular fittings or nipples and then welded, brazed or soldered thereto. Fittings of this type are peculiarly adapted for use in systems where safety requirements specify a permanently sealed system, for example in refrigeration systems. For some uses the end fittings may be screw threaded for convenience in making connections with the equipment with which the hose is to be used.

The hose reinforcement of this invention is relatively inextensible, is coextensive with the hose, and is secured at its ends against movement longitudinally of the hose. This reinforcement comprises two similar, elongated ribbon-like members 14, 15, each having substantially coplanar longitudinally extending edge portions 16, 17 connected by crossbands 18 uniformly spaced along the length of the edge portions. These crossbands 18 are bowed outwardly in a common direction from the plane of the edge portions to substantially semicylindrical contour, as shown in the drawings, so that each ribbon-like member is concave on one face and convex on the other face, intermediate its coplanar edge portions 16, 17.

The two reinforcing members shown in the illustrative embodiment are alike and conveniently may be made in one continuous length by a continuous operation, thereafter being cut to the desired lengths. In making the reinforcing members a continuous metal ribbon of width somewhat greater than one-half the circumference of the hose will be passed through a punching machine which punches a series of uniformly spaced openings or spaces 19 which are separated by the crossbands 18 connecting the coplanar edge portions 16, 17 of the ribbon. The dimension of these openings 19 transversely of the ribbon, i. e. their length, will be equal to, or very slightly greater than, one-half the circumference of the hose. The width of the openings 19, i. e. the dimension longitudinally of the ribbon, may vary for different hose reinforcements. Desirably, the width of the openings 19 should not be great enough to permit a convolution or corrugation of the hose to be forced outwardly between the crossbands in any expected service. The width of the crossbands 18, i. e. the dimension longitudinally of the hose, also may vary considerably for different hose reinforcements. Ordinarily the width of the crossbands will be equal to, or greater than, the width of the openings, and it may be as great as twice the width of the openings, or even more, without interfering with the desired flexibility of the reinforced hose.

After the openings 19 have been punched, the ribbon conveniently then may be passed through a rolling or pressing machine which will bow the crossbands 18 outwardly in a common direction from the plane of the edge portions 16, 17 to substantially semicylindrical contour. The ribbon thus formed may be cut to the desired lengths for making hose reinforcements.

Two of these ribbon-like members 14, 15, of length substantially equal to the length of the hose to be reinforced, are assembled on the hose 11 with their concave faces toward each other so that the coplanar edge portions of the two ribbon-like members lie face to face and the hose is encircled by the crossbands of the two members. The edge portions 16, 17 of the two ribbon-like members then are secured together. Conveniently this may be done by riveting, as illustrated at 23, or bolting the adjacent edge portions together at uniformly spaced points. The holes to receive the rivets or bolts conveniently may be punched during the formation of the long continuous length of strip material. Alternatively, the edge portions may be spot-welded together instead of being riveted. With the longitudinal edges of the ribbon-like members secured together, the crossbands 18 constitute a reinforcement against radial expansion of the hose.

The assembled reinforcement is relatively inextensible as compared to the hose. The plane passing between the edge portions of the two ribbon-like members passes, at least approximately, through the longitudinal axis of the hose. The reinforcement is, of course, relatively inflexible in this plane and hence the reinforced hose will be restrained against flexure to right or to left, as viewed in Figure 1. Because the crossbands 18 and intervening spaces 19 form a lattice-like structure, the reinforcing members are relatively flexible in the longitudinal plane at 90°, and the hose may be flexed to right and to left, as viewed in Figure 3.

To provide reinforcement against longitudinal extension of the hose, the ends of the reinforcement are secured against movement longitudinally of the hose. In the illustrative embodiment each end of the hose reinforcement is secured against such movement by reason of the ends of the ribbon-like members 14, 15 being connected to a collar telescoped onto the end fitting 12, or 13, as the case may be. As illustrated this connection is made by means of screws or bolts 20 passing through openings in the longitudinally extending edge portions 16, 17 of the two ribbon-like members and through matching openings in the approximately diametrically disposed ears 21 on the collar 22. As pointed out hereinabove, the outside diameter of an end fitting of the type disclosed in the drawings ordinarily will be less than the outside diameter of the hose, and movement of the collar 22 over the end of the hose and along the hose may be limited by providing the collar with a stepped bore as shown in Figure 5.

Conveniently the collar 22 is made to be initially freely rotatable on the end fittings 12, 13, so that it may be rotatably adjusted relative thereto. Either during manufacture of the hose or during installation thereof, the collars 22 will be secured against such rotation. An advantage of the present construction is that the securing of the reinforcement against rotation about the hose may be made after the hose has been installed. After the end fittings 12, 13 of a hose have been connected to the equipment with which the hose is to be used, the reinforcement will be rotatably adjusted about the hose to orient accurately the flexing plane of the reinforcement so that it coincides with the desired flexing of the installed hose. Then the collars may be secured against further rotation, for example by soldering, brazing or in any other suitable manner. The fact that the ends of the reinforcement are firmly secured to the end fittings on the hose resists twisting of the hose about its longitudinal axis and reduces the possibility of setting up localized torsional stresses in the hose adjacent the end fittings during operation of the apparatus. The fact that flexure of the hose is substantially restrained to a single plane assists in keeping the longitudinal axes of the end fittings in a common plane when the hose is bent, as it usually will be for installation. In this way the danger of establishing concentrated stress zones in the hose adjacent the end fittings at the time of installation is reduced.

The material and the dimensions of the reinforcing members may vary considerably. Preferably the ribbon-like reinforcing members are made from metal which has a suitable high tensile strength, for example bronze or steel. When used on metal hose it may be made from, or covered with, the same material as the hose. The thickness and width of the strips will be such as to provide the desired tensile strength, resistance to twisting about the longitudinal axis, and resistance to flexure in the plane of the strip.

It is known that the stresses set up in a hose upon bending tend to be concentrated in zones adjacent the end fittings and that this is where the hose reinforcement and the hose itself are most likely to fail. This is particularly true in short lengths of hose employed for interconnecting relatively movable members. The hose reinforcement of the present invention lends itself to having combined therewith means for gradually increasing the resistance of the hose to flexure as the distance to the end of the hose decreases. Ordinarily it will be sufficient if this graduated flexibility of the hose extends for a short distance only from the end fittings a distance equal to several times the diameter of the hose. In order to obtain this graduated flexibility for the hose, the edge portions 16, 17 of the reinforcing members 14, 15 are stiffened, adjacent their ends, with one or more additional members 24 lying along the edge portions and providing graduated flexibility along the length thereof. This feature is claimed in my copending application above mentioned.

In the illustrative embodiments the edge portions 16, 17 are stiffened with additional leaves or strips 24 of metal of graduated lengths. These leaves are laid alongside the coplanar edge portions and their ends adjacent the end fitting are rigidly secured to the end fitting, preferably in the same manner as the edge portions. The outer graduated ends of these leaves may be secured to the edge portions, for example by rivets, as shown. The width of these leaves conveniently will be about the same as the width of the edge portions, and their thickness, exaggerated in the drawings for purposes of illustration, their number, and their lengths may be varied depending on the material from which they are made, the stiffness of the hose, the extent to which the hose must be bent, and other factors. All of the leaves may lie on one side of the edge portions, or some on one side and some on the other as shown. The effect of the leaves is to gradually increase the resistance of the hose to flexure as the distance to the end fitting decreases, so as to produce a more uniform distribution of flexure along the length of the hose and avoid the concentration of bending stresses adjacent the end fitting. It will be understood that the hose reinforcement of the present invention may be used without the additional stiffening members.

A slight modification in the construction of the ribbon-like reinforcing members is shown in Figures 4 and 5. In this modification the openings or spaces 29 do not extend perpendicular to the edge portions 26, 27 of the ribbon-like members, but are at an angle thereto different than 90°, so as to give to the crossbands 28 a helicoidal conformation about the hose. When used with helically convoluted hose, the direction of the helical crossbands desirably will be opposite to that of the convolutions of the hose. This construction has the advantage, particularly when used with convoluted or corrugated metal hose, that it reduces the liability of a convolution or corrugation being forced outwardly between two crossbands when the reinforced hose is bent.

While the drawings show the hose reinforcing member applied to a flexible metal hose, it will be understood that this same reinforcing member also may be used with non-metallic hose. If desired, this reinforcing member may be applied to a hose having a braided casing.

Applicant's reinforced hose and hose reinforcement have important advantages over the prior art. With applicant's construction the hose is reinforced against longitudinal extension and radial expansion, and also is protected against abrasion. Flexure of the hose is substantially limited to a plane and twisting of the hose is restrained. If desired, the end portions of the reinforcement may readily be made with graduated flexibility.

It will be understood that the invention herein disclosed may be variously modified and embodied within the scope of the subjoined claims.

I claim:

1. A hose reinforced against longitudinal extension and radial expansion comprising, in combination, a length of flexible hose, end fittings attached to the ends of the hose, a relatively inextensible reinforcement coextensive with the hose and secured at its ends against movement longitudinally of the hose to restrain the hose against longitudinal extension, the reinforcement comprising two similar elongated ribbon-like members, each having substantially coplanar longitudinally extending edge portions connected by crossbands uniformly spaced from each other along the edge portions and bowed outwardly in a common direction from the plane of the edge portions substantially to semicylindrical contour, the said two elongated members being assembled on the hose to encircle the hose with the crossbands proximate to the hose, and means securing adjacent edge portions of the two elongated members together so that the bands will restrain the hose against radial expansion.

2. A reinforced hose according to claim 1, in which the edge portions of the two elongated members are secured together at uniformly spaced points therealong.

3. A reinforced hose according to claim 1, in which the edge portions of the two elongated members are secured together by spot welds spaced therealong.

4. A reinforced hose according to claim 1, in which the crossbands have a helicoidal conformation with respect to the longitudinal axis of the hose.

5. A reinforced hose according to claim 1, in which the width of the crossbands is equal to or greater than the width of the spaces therebetween.

6. A reinforced hose according to claim 1, in which the ends of the relatively inextensible reinforcement are secured to collar members initially rotatably adjustably disposed on the end fittings, said collar members being secured in adjusted rotatable position on the end fittings.

7. A reinforced hose according to claim 6, in which the end fittings have a smaller outside diameter than the hose, and in which the inside diameter of the collar members is less than the outside diameter of the hose.

References Cited in the file of this patent

UNITED STATES PATENTS

| | | |
|---|---|---|
| 1,035,931 | Woodhouse | Aug. 20, 1912 |
| 1,371,981 | Rose | Mar. 15, 1921 |
| 1,677,077 | Fortune | July 10, 1928 |
| 2,177,128 | Johnson | Oct. 24, 1939 |

FOREIGN PATENTS

| | | |
|---|---|---|
| 516,796 | Great Britain | Jan. 11, 1940 |